Oct. 14, 1930.   T. F. BAILY   1,778,578
ELECTRIC REFINING FURNACE
Filed Jan. 28, 1928
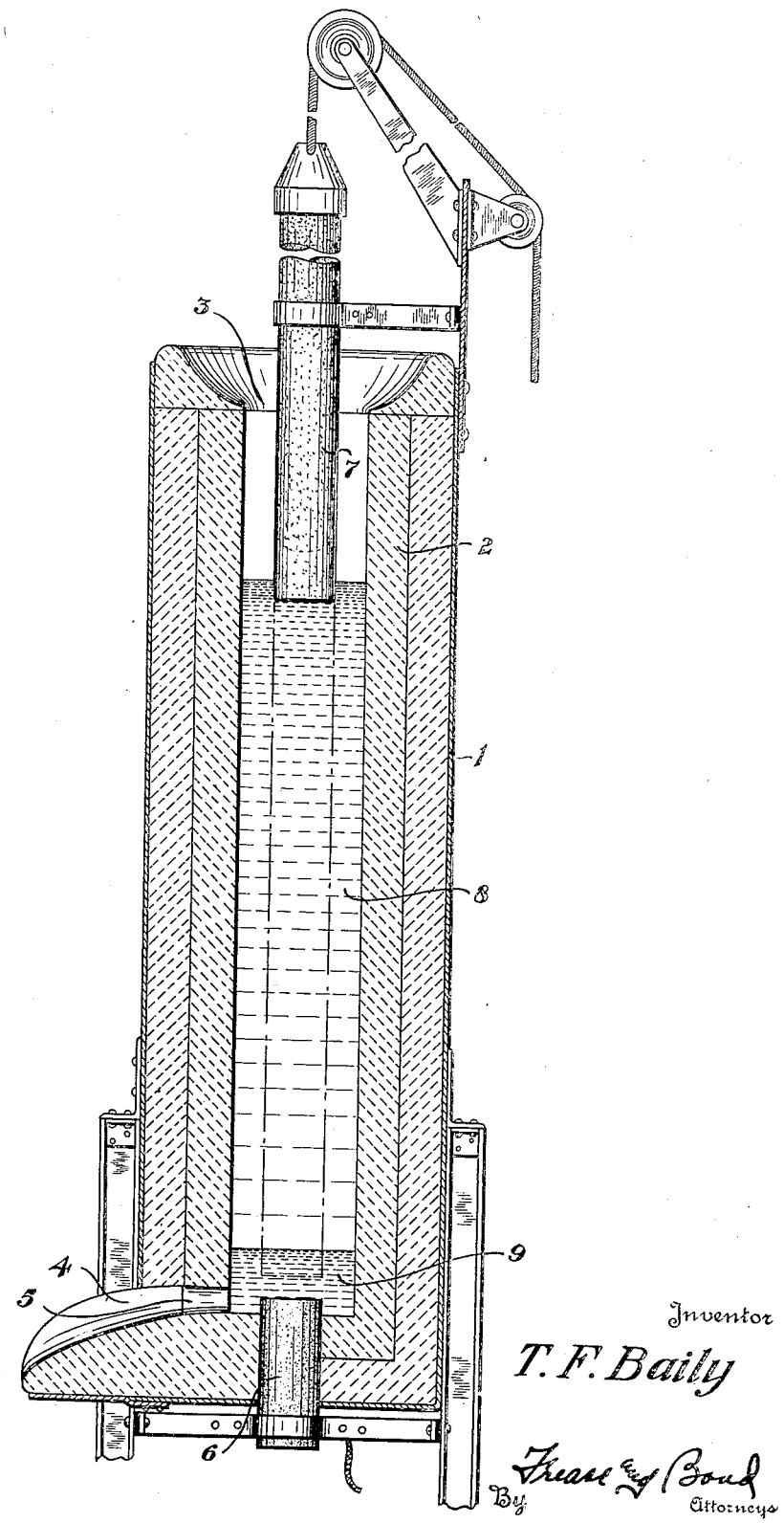
Inventor
*T. F. Baily*

Patented Oct. 14, 1930

1,778,578

UNITED STATES PATENT OFFICE

THADDEUS F. BAILY, OF ALLIANCE, OHIO

ELECTRIC REFINING FURNACE

Application filed January 28, 1928. Serial No. 250,221.

This invention relates to electric furnaces for melting and refining metals and the like, and more particularly to a furnace wherein all or a portion of the heat is developed by electric resistance in a resistor composed of a molten slag which may or may not be of such composition as to perform a metallurgical treatment such as refining.

In the past, various forms of electric arc and resistance furnaces have been constructed wherein the slag carried current but in this furnace the length of travel through the molten slag is such as to form a resistor which may be maintained at any desired temperature.

The object of the improvement is to provide a furnace in which the metal or other material to be treated will be charged at the top of the furnace and passed down through the molten slag resistor and, having been superheated or refined, collects in the bottom of the furnace and, being a better conductor of electricity than the slag, ceases after passing through the slag, to form any material resistance to the flow of electric current and hence no undue superheating.

Another object of this invention is that if after a molten slag has been obtained and it is desired to melt material, the voltage on the furnace may be increased and an arc established above the slag, and solid materials that are to be treated or melted may be charged in at the top of the furnace on top of the slag where they will float until reduced to the melted condition, after which they will pass down through the slag.

An embodiment of the invention is illustrated in the accompanying drawing, in which The figure is a vertical section of the improved furnace.

Similar numerals refer to similar parts throughout the drawing.

The furnace may be of the shaft type, as illustrated, having the metal shell 1, and refractory lining 2, provided with the charging opening 3, at its upper end.

The pouring spout 4 may be provided at the lower end portion of the furnace, having the plug 5, which may be removed to discharge the contents of the furnace, or any desired portion thereof.

An electrode 6 may be located in the lower end of the furnace and in the same circuit with the movable electrode 7, which extends down through the charging opening at the top of the furnace.

Any suitable means may be provided for raising and lowering this upper electrode, and the same is preferably of sufficient length to extend substantially to the lower end of the furnace, as indicated in broken lines on the drawing.

When the furnace is used for refining molten steel, for instance for phosphorus, a molten oxidizing slag is produced in the furnace, preferably by allowing the top electrode 7 to extend down in the empty furnace until an arc is formed with the bottom electrode 6, in the position shown in broken lines in the drawing.

An oxidizing slag-making material indicated at 8 is then fed into the furnace and melted by the arc above mentioned and as the molten slag level rises with the further addition of slag, the upper electrode is moved upwards, continuing to melt the fresh slag and maintain the molten slag in the melted condition by resistance.

When the molten slag reaches the desired height, the upper electrode is allowed to form contact with the molten slag without an arc as shown in the drawing, and sufficient current is maintained to keep the slag at the desired temperature.

Molten metal is then fed into the furnace at the top and passes down through the molten slag in a small stream or streams, so that there is a large amount of slag surrounding the molten metal at all times as it passes through the slag, thus increasing the rapidity with which the refining of the metal is accomplished as compared with ordinary metallurgical practice where the surface of metal exposed to the slag is only a small proportion of that as indicated by this process.

The molten metal, after passing down through the slag, will collect below the same, at the bottom of the furnace, as shown at 9, and may be withdrawn from time to time, by removing the plug from the pouring spout.

As the slag becomes saturated with impurities picked up from the metal to be refined, it all or a portion of it may be tapped off after the metal is removed and in the case of where only a portion of the slag is removed, additional slag may be fed in at the top and melted as in the case of starting.

It is to be understood that in the case of melting scrap steel for instance, the most desirable class of material to melt in this furnace will be light turnings or light scrap material, which, due to its finely divided condition, will not readily sink through the slag.

When melting the scrap material in the furnace, the upper electrode may be pulled up, out of the slag, producing an arc at this point which will rapidly melt down the scrap material floating upon the top of the slag, causing the molten metal to pass downward through the slag, as above described.

It is further to be understood that such solid material as may get into the slag will cool the slag somewhat and due to the fact that the resistivity of slag increases with the decreasing of temperature, such cooling effect as mentioned will serve to increase the electric resistivity and hence the heat input in such portion.

The furnace as indicated above may have a length much greater than the diameter thereof and as shown in the drawings, the length of the shaft type furnace may be some 8 or 9 times the diameter of the furnace while the molten slag resistor column may have a length of some 6 or 7 times the diameter thereof. Also the diameter of the electrodes is preferably substantially one-half, more or less, of the diameter of the furnace.

Thus the current passing through the molten slag resistor between the two electrodes passes equally substantially throughout the entire length and breadth of the molten slag resistor, and the temperature thereof is maintained substantially the same throughout all portions thereof. By controlling the current passing between the electrodes, the temperature of the molten slag resistor may be controlled. Consequently the refining operation performed in such a structure is uniformly accomplished and easily controlled.

I claim:

1. A resistance type furnace including walls forming a refining chamber having a uniform cross section throughout its length, an electrode at each end of the chamber, a molten slag resistor within the chamber extending between the electrodes, the molten resistor column having a length of at least three times its greatest dimension in cross section, and the greatest dimension of the electrodes in cross section being substantially equal to one-half of the greatest dimension of the resistor column in cross section, whereby when an electric current is passed between the electrodes through the resistor, the temperature of the molten resistor will be uniform throughout the entire body of molten slag resistor.

2. A resistance type furnace including walls forming a vertical refining chamber having a uniform cross section throughout its height, electrodes at the top and bottom of the chamber, the top electrode being movable within the chamber throughout the height thereof, a molten slag resistor column within the chamber extending between the electrodes and having a height of at least three times its cross sectional dimension, and the cross sectional dimensions of the electrodes being substantially equal to one-half of the cross sectional dimension of the resistor column.

In testimony that I claim the above, I have hereunto subscribed my name.

THADDEUS F. BAILY.